US012220613B2

(12) United States Patent
Koh et al.

(10) Patent No.: US 12,220,613 B2
(45) Date of Patent: Feb. 11, 2025

(54) FREEWHEEL ADJUSTABLE WHEEL AND EXERCISE BICYCLE INCLUDING SAME

(71) Applicant: LG ELECTRONICS INC., Seoul (KR)

(72) Inventors: Sunggyu Koh, Seoul (KR); Min Seok Kim, Seoul (KR); Dongkyu Choi, Seoul (KR); Yong-Hee Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 59 days.

(21) Appl. No.: 18/025,152

(22) PCT Filed: Sep. 8, 2021

(86) PCT No.: PCT/KR2021/012245
§ 371 (c)(1),
(2) Date: Mar. 7, 2023

(87) PCT Pub. No.: WO2022/055263
PCT Pub. Date: Mar. 17, 2022

(65) Prior Publication Data
US 2023/0321481 A1    Oct. 12, 2023

(30) Foreign Application Priority Data
Sep. 9, 2020  (KR) ........................ 10-2020-0115098

(51) Int. Cl.
*A63B 22/06* (2006.01)
*A63B 21/00* (2006.01)
(Continued)

(52) U.S. Cl.
CPC ...... *A63B 22/0605* (2013.01); *A63B 21/0058* (2013.01); *A63B 21/151* (2013.01);
(Continued)

(58) Field of Classification Search
CPC ............ A63B 22/0605; A63B 22/0664; A63B 2022/0611; A63B 2022/0617;
(Continued)

(56) References Cited

U.S. PATENT DOCUMENTS 10,800,485 B2    10/2020  Kim et al.
2006/0169814 A1   8/2006  Ikuta et al.
(Continued)

FOREIGN PATENT DOCUMENTS

| CN | 102380183 A | 3/2012 |
|---|---|---|
| EP | 1 629 714 A1 | 3/2006 |
| JP | 2001-170206 A | 6/2001 |
| KR | 10-2004-0101846 A | 12/2004 |
| KR | 10-0887254 B1 | 3/2009 |
| KR | 10-1641429 B1 | 7/2016 |
| KR | 10-1685599 B1 | 12/2016 |
| WO | WO 01/08754 A1 | 2/2001 |

*Primary Examiner* — Zachary T Moore
(74) *Attorney, Agent, or Firm* — Birch, Stewart, Kolasch & Birch, LLP

(57) ABSTRACT

The present invention relates to a freewheel adjustable wheel and an exercise bicycle including the same and. More specifically, may comprise a rotation gear part which rotates together with a pulley fixed to the outer side thereof and has a circular gear formed along the outer circumference thereof; a case part for rotatably supporting the rotation gear part; a first power transmission part for transmitting power which has been transmitted to the rotation gear part to the case part when the rotation gear part rotates in the normal direction; and a second power transmission part for transmitting power which has been transmitted to the rotation gear part to the case part when the rotation gear part rotates in the reverse direction.

20 Claims, 16 Drawing Sheets

(51) Int. Cl.
*A63B 21/005* (2006.01)
*A63B 21/22* (2006.01)
*A63B 23/04* (2006.01)
*B60B 27/04* (2006.01)

(52) U.S. Cl.
CPC .......... *A63B 21/157* (2013.01); *A63B 21/225* (2013.01); *A63B 23/0494* (2013.01); *A63B 2022/0641* (2013.01); *B60B 27/047* (2013.01)

(58) Field of Classification Search
CPC .... A63B 2022/0623; A63B 2022/0629; A63B 2022/0635; A63B 2022/0688; A63B 21/0057; A63B 21/0058; A63B 21/157; A63B 21/225
See application file for complete search history.

(56) References Cited

U.S. PATENT DOCUMENTS

| | | | |
|---|---|---|---|
| 2011/0136618 A1* | 6/2011 | Lee | B62M 11/14 475/331 |
| 2018/0009608 A1* | 1/2018 | Danner | E05F 15/603 |
| 2019/0112002 A1* | 4/2019 | Kim | B62M 6/65 |
| 2021/0169725 A1* | 6/2021 | Baldwin | A61H 1/005 |

* cited by examiner

FREEWHEEL ADJUSTABLE WHEEL AND EXERCISE BICYCLE INCLUDING SAME

CROSS-REFERENCE TO RELATED APPLICATIONS

This application is the National Phase of PCT International Application No. PCT/KR2021/012245 filed on Sep. 8, 2021, which claims priority to Korean Patent Application No. 10-2020-0115098 filed in the Republic of Korea on Sep. 9, 2020, the entirety of which are hereby expressly incorporated by reference into the present application.

TECHNICAL FIELD

The present disclosure relates to a freewheel adjustable wheel that may control whether or not power from a pedal is transmitted to the wheel when the pedal rotates in the reverse direction, and an exercise bicycle including the same.

BACKGROUND ART

In general, as indoor exercise equipment for strengthening muscle strength, weights for strengthening muscle strength and aerobic exercise equipment for strengthening cardiopulmonary function are widely used as fitments equipment.

Such aerobic exercise equipment is largely categorized into a treadmill that allows users to walk or run on an endless track, an exercise bicycle that strengthens leg muscles and allows caridorespiratory exercise by rotating the pedals, and a stepper that provides an effect of climbing stairs.

The exercise bicycle is installed in a designated place, and wheels are rotated by the action of stepping on the pedals to exercise. Such the exercise bicycle may be divided into a spinning bicycle capable of performing spinning exercises and an indoor bicycle that rotates wheels by rotating pedals in a forward direction like a bicycle.

The spinning bicycle has a non-freewheel structure due to the nature of exercising while pedaling, and the indoor bicycle has a freewheel structure.

The non-freewheel structure applied to the spinning bicycle is configured to transmit power to the wheel to rotate the wheel when the penal is rotated in a forward direction and when the pedal is rotated in the reverse direction.

In addition, the freewheel structure applied to the indoor bicycle is configured to transmit power to the wheel only when the penal is rotated in the forward direction and not to transmit power to the wheel when the pedal is rotated in the reverse direction.

The conventional power transmission structure of the spinning bicycle and the indoor bicycle is different. Accordingly, when the spinning exercise and the bicycle exercise are alternately performed, the user there is a problem of increasing the purchase cost of the exercise equipment because the spinning bicycle and the indoor bicycle have to be purchased respectively. Therefore, there is a need to improve this.

The background art of the present disclosure is disclosed in Korean Patent Registration No. 10-1641429 (registered on Jul. 14, 2016, Title of Disclosure: Spinning bicycle).

DESCRIPTION OF DISCLOSURE

Technical Problems

Accordingly, one object of the present disclosure is to provide a freewheel adjustable wheel selectively using a freewheel function, and an exercise bicycle including the same.

Another object of the present disclosure is to provide a freewheel adjustable wheel that can be used as one exercise machine for spinning exercise and cycling exercise, and a exercise bicycle including the same.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Technical Solutions

A freewheel adjustable wheel and an exercise bicycle including the same to solve the above-noted objects of the present disclosure may is characterized in that a freewheel operation of a wheel may be easily controlled by operating or stopping an operation of engaging a second power transmission part to a rotation gear part.

Specifically, when a pedal is rotated in a forward direction, a rotational power transmitted to the rotation gear part through a pulley may be transmitted to the case through a second power supply part and then rotate a case.

When the pedal is rotated in the reverse direction, the rotational power transmitted to the rotation gear part through the pulley may be transmitted to the case through the engaging gear part of the second power transmission part and then rotate the case.

The freewheel adjustable wheel according to the present disclosure may include at least one of a pulley, a rotation gear part, a case, a first power transmission part and a second power transmission part.

The pulley may be rotatable by power transmitted from a pedal. The rotation gear part may be rotatable together with the pulley secured to an outside thereof, and may include a circular gear provided along an outer circumference thereof.

The case may rotatably support the rotation gear part.

The first power transmission part may be connected to the rotation gear part and the case and may rotatably support the rotation gear part, and may be configured to transmit power transmitted to the rotation gear to the case only when the rotation gear part is rotated in a forward direction.

The second power transmission part may be provided in the case and engaged with the circular gear by operating due to an external force, and configured to transmit power transmitted to the rotation gear part to the case when the rotation the rotation gear part is rotated in the reverse direction.

The rotation gear part may include a rotary shaft member extending from a center of the circular gear to both sides thereof, the rotary shaft member in which the pulley is detachable provided and configured to rotate together with the pulley.

The case may include an outer case in which the second power transmission part is detachable provided, the outer case having the pulley disposed on the outside thereof and the first power transmission part disposed on the inside thereof; and an inner case secured inside the outer case and connected with the first power transmission part, the inner case rotatably supporting the second power transmission part.

The inner case may include an inner case body secured to the inside of the outer case and having a center at which the rotation gear part is disposed; and a rotation support protruding from the inner case body, with a shape surrounding the first power transmission part, and rotatably supporting the rotation gear part.

The inner case may include a space maintaining protrusion protruding toward the case and configured to maintain a space between the inner case body and the case.

The inner case may further include a first guide having a groove formed on a lateral surface thereof facing the second power transmission part, and configured to guide rotation of the second power transmission part.

The first guide may include a first guide groove configured to guide rotation of an engaging gear part provided in the second power transmission part, and having a fan-shaped groove formed on a lateral surface of the inner case facing the engaging gear part; and a second guide provided inside the first guide groove and having an arc-shaped groove formed along a moving path of the engaging gear part.

The first power transmission part may include a first power transmission body having a ring shape, and the first power transmission body may be a one-way clutch bearing.

The first power transmission part may include a first key member connecting an inside of the first power transmission body and an outside of the rotation gear part with each other; and a second key member connecting an outside of the first power transmission body and the case with each other.

The second power transmission part may include a power transmission case detachably coupled inside the case; a handle rotatably coupled to the power transmission case; and an engaging gear part connected with the handle with the power transmission case interposed therebetween and rotatably coupled to the case, and configured to be rotated together with the handle and engaged with the circular gear.

The engaging gear part may include an engaging gear body connected with the handle and configured to be rotated together with the handle and engaged with circular gear; a coupling body coupled to the engaging gear body; and an elastic engaging portion provided in the engaging gear body and the coupling body, and configured to be moved by elasticity and engaged with the power transmission case.

The engaging gear body may include a first body comprising a connection groove in which the handle is inserted to be engaged therewith; and a second body extending from the first body and coupled to the coupling body with the elastic engaging portion interposed therebetween, and configured to be engaged with a gear of the circular gear.

The elastic engaging portion may include a moving protrusion provided at a boundary between the engaging gear body and the coupling body and protruding to an outside of the engaging gear part; and an elastic member provided at a boundary between the engaging gear body and the coupling body and configured to pressurize the moving protrusion toward an outside of the engaging gear part.

The power transmission case may further include a second guide having a groove formed a lateral surface thereof facing the second power transmission part and configured to guide rotation of the second power transmission part.

The second guide may include an inner guide groove having an arc-shaped groove formed along a moving path of the engaging gear part; and a securing groove provided in both sides of the inner guide groove and having a groove formed at a position at which the engaging gear part is stopped.

An exercise bicycle according to the present disclosure may include a frame, a pedal, a pulley and a freewheel adjustable wheel. The frame may support a bicycle seat and a handle. The pedal may be rotatably coupled to the frame.

The pulley may be rotatable by power transmitted from the pedal, and connected with the freewheel adjustable wheel.

The rotation gear part may include a circular gear along an outer circumference. An outer flat portion with a flat surface shape provided on an outside of a rotary shaft member may be provided in contact with an inner flat portion of the pulley provided on an outside of the rotary shaft member.

Advantageous Effect

According to the freewheel adjustable wheel and the exercise bicycle including the same, the freewheel function may be selectively used by the operation of the second power transmission part, thereby improving usability of exercise equipment.

In addition, it is not necessary to separately purchase exercise equipment based on the presence of the freewheel function. Accordingly, purchase cost of exercise equipment may be reduced.

In addition, the second power transmission part is operated by the user's manipulation without using a separate driving motor, thereby reducing electricity costs.

In addition, the second power transmission part is configured of a module and detachably coupled in the case, thereby reducing the time and cost required for replacement and repair of the second power transmission part.

In addition, the elastic engaging portion may be inserted in the securing groove of the power transmission case to maintain a still state, thereby improving the operation reliability.

Specific effects are described along with the above-described effects in the section of Detailed Description.

DETAILED DESCRIPTION OF EXEMPLARY EMBODIMENT

Figure 1:
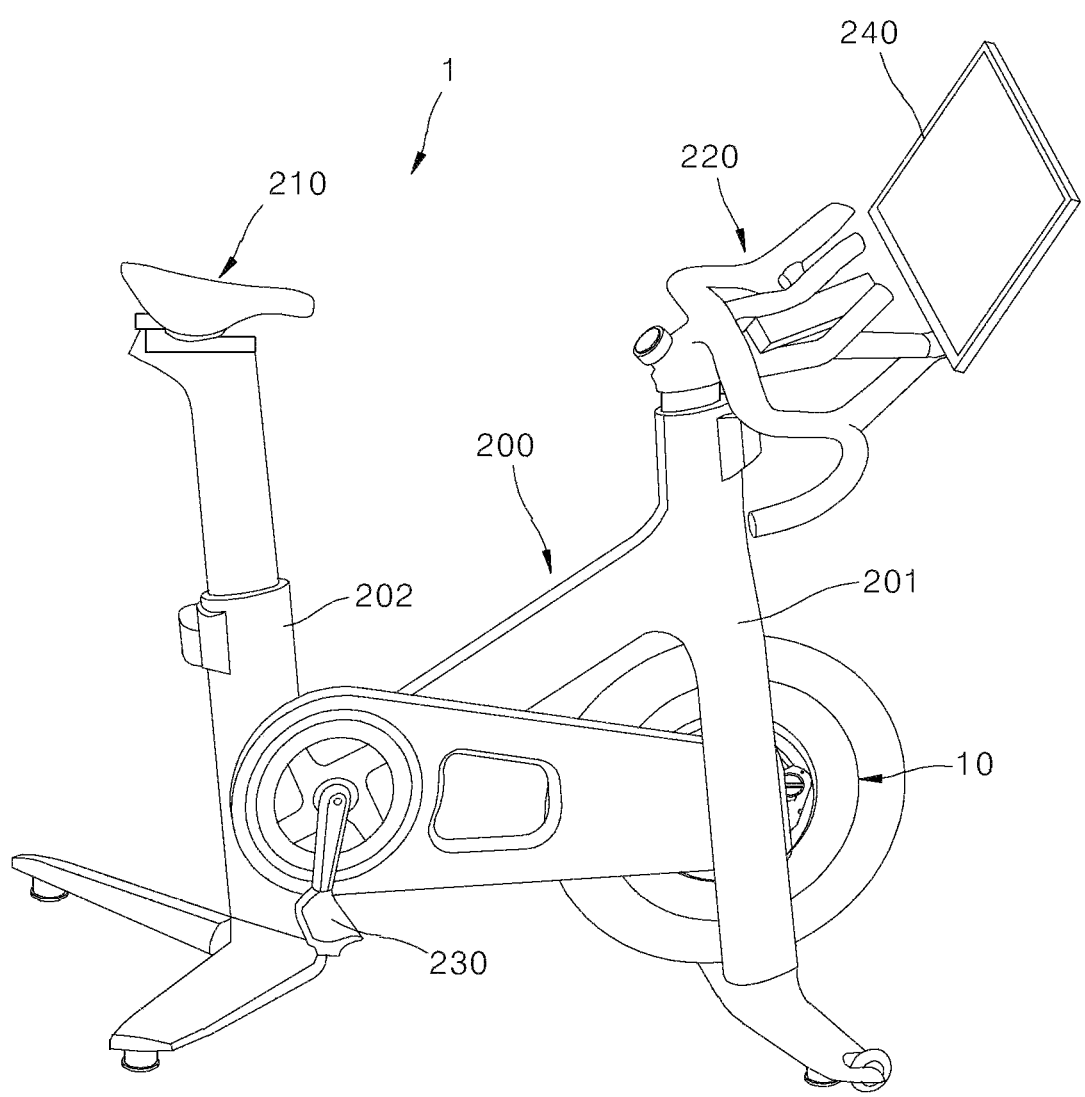
FIG. 1 is a perspective view showing a exercise bicycle including a freewheel adjustable wheel according an embodiment.

The above-described aspects, features and advantages are specifically described hereunder with reference to the accompanying drawings such that one having ordinary skill in the art to which the present disclosure pertains can easily implement the technical spirit of the disclosure. In the disclosure, detailed descriptions of known technologies in relation to the disclosure are omitted if they are deemed to make the gist of the disclosure unnecessarily vague. Below, preferred embodiments according to the disclosure are specifically described with reference to the accompanying drawings. In the drawings, identical reference numerals can denote identical or similar components.

Figure 2:
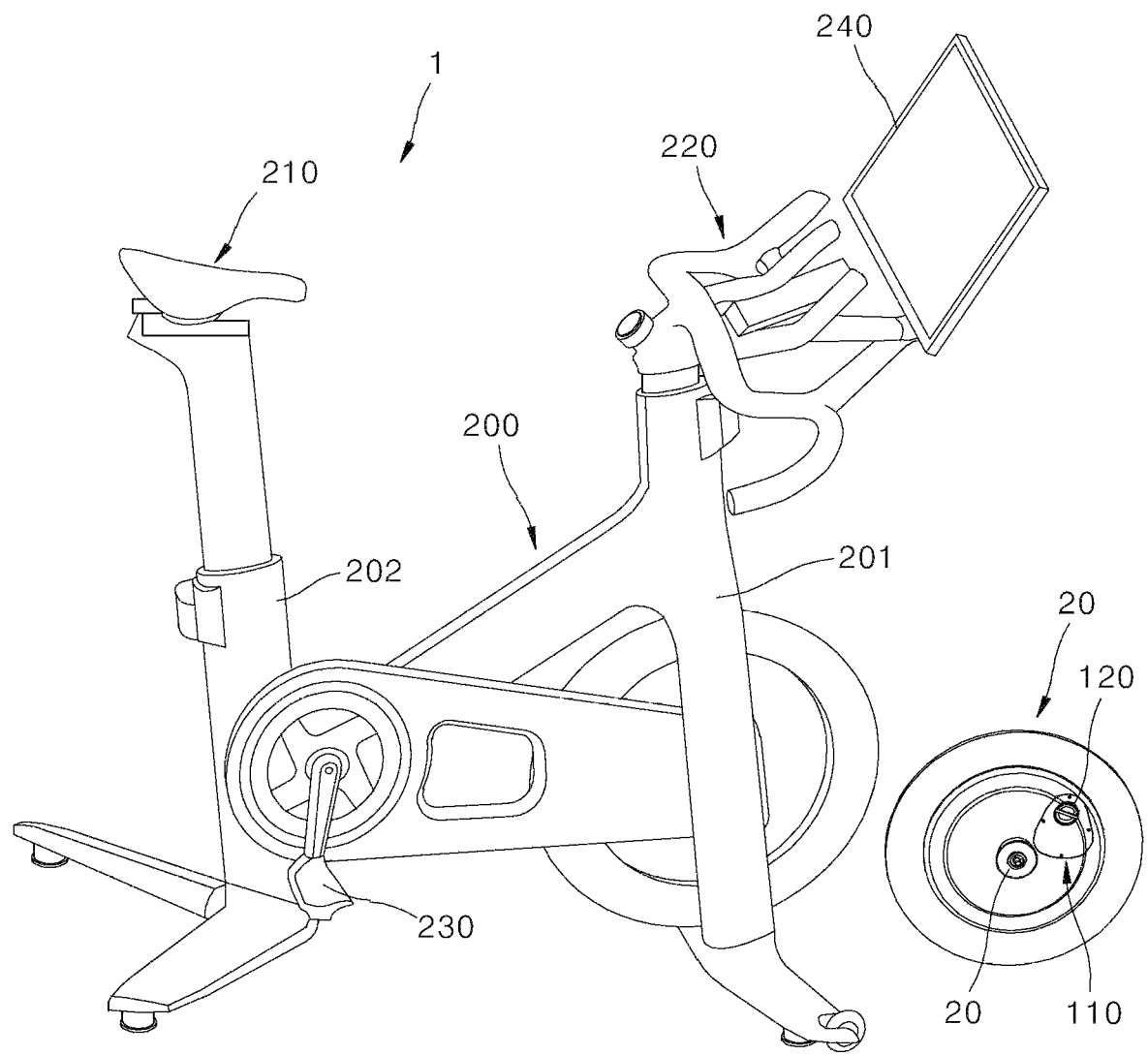
FIG. 2 is a perspective view showing a state in which a freewheel adjustable wheel is separated from a exercise bicycle according to an embodiment.

FIG. 1 is a perspective view showing an exercise bicycle 1 including a freewheel adjustable wheel according an embodiment. FIG. 2 is a perspective view showing a state in which a freewheel adjustable wheel 10 is separated from the exercise bicycle 1 according to the embodiment.

As shown in FIGS. 1 and 2, the exercise bicycle 1 according to the embodiment may include a frame 200, a pedal part 230, a pulley 20 and a freewheel adjustable wheel 10.

The frame 200 may be configured to support a bicycle seat 210 and a handle 220, and may be modified in various shapes within a technical scope of rotatably supporting the pedal part 230. The frame 200 according to an embodiment may include a first frame 201 supporting the freewheel adjustable wheel 10 and a second frame supporting the bicycle seat 210.

The pedal part 230 may be rotatably coupled to the frame 200 and configured to rotate in a forward direction or reverse direction (or clockwise direction or counter-clockwise direction). The pulley 20 may be rotatable by power transmitted from the pedal part 230 through a chain or belt and connected to the freewheel adjustable wheel 10. In addition, a monitor 240 configured to output information related to exercises may be supported by the frame 200.

Figure 3:
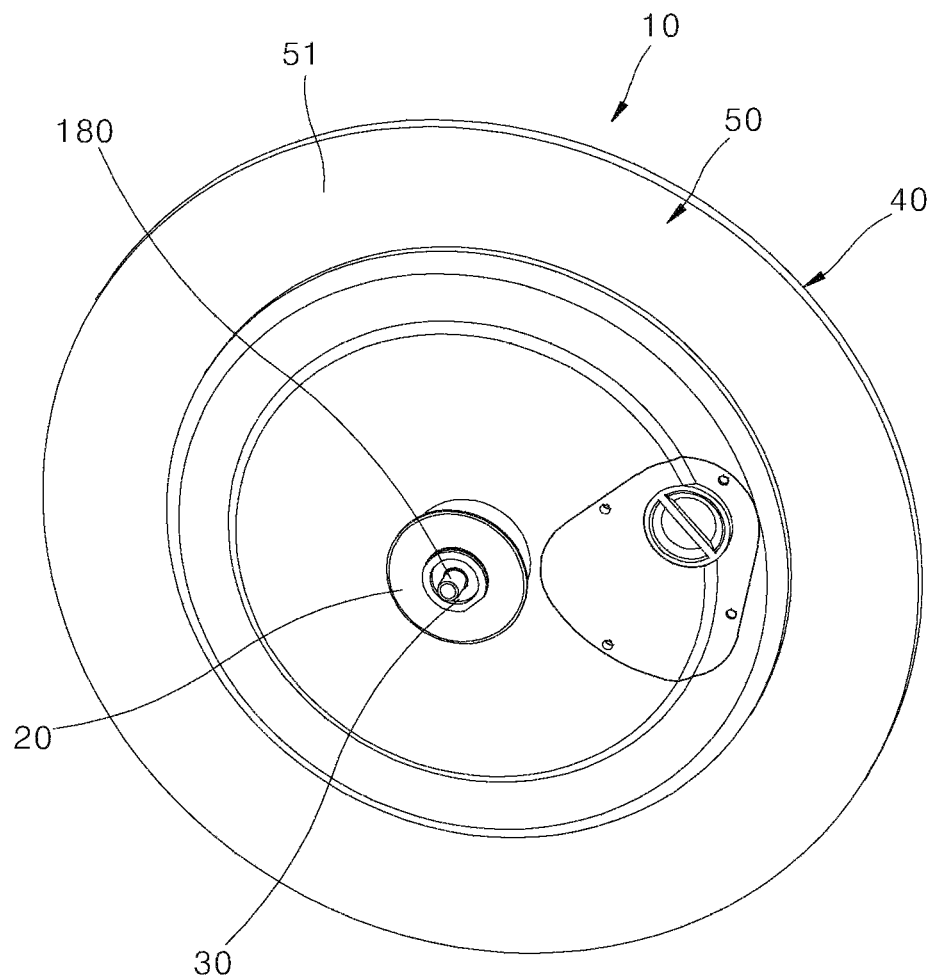
FIG. 3 is a perspective view showing a freewheel adjustable wheel according to an embodiment.
Figure 4:
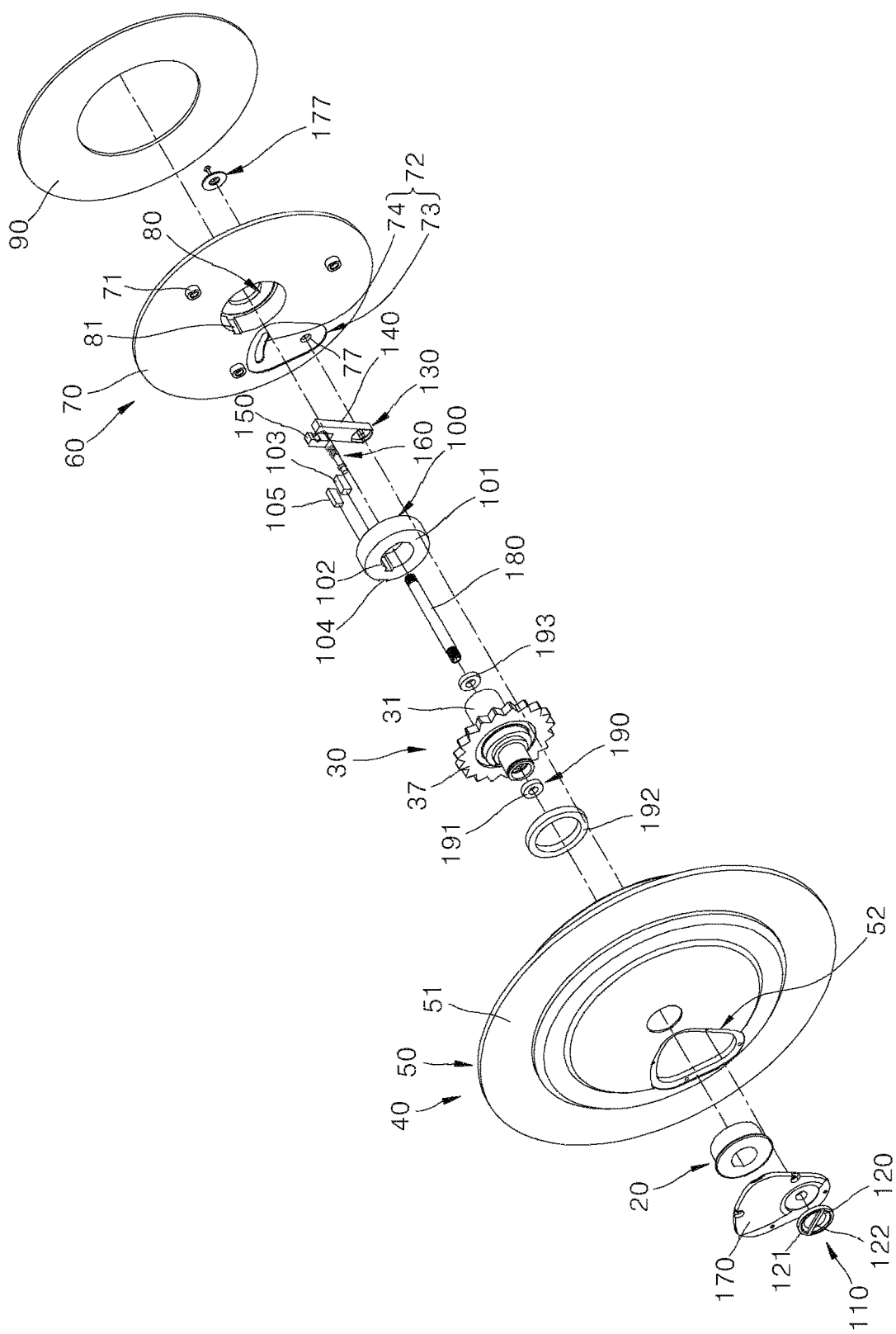
FIG. 4 is an exploded perspective view of a freewheel adjustable wheel according to an embodiment.

FIG. 3 is a perspective view showing a freewheel adjustable wheel 10 according to an embodiment. FIG. 4 is an exploded perspective view of a freewheel adjustable wheel 10 according to an embodiment.

As shown in FIGS. 3 and 4, the freewheel adjustable wheel 10 according to the embodiment may include at least one of a pulley 20, a rotation gear part 30, a case 40, a first power transmission part 100 and a second power transmission part 110.

The freewheel adjustable wheel 10 may be modified in various ways within a technical scope of easily controlling the freewheel operation of the wheel based on the engaging or releasing the second power transmission part 30 with or from the rotation gear part 30.

The freewheel adjustable wheel 10 according to the present disclosure may be configured to allow a user to easily select two freewheel and non-freewheel power transmission methods by rotating a handle 120 provided in the second power transmission part 110.

For example, when the pedal part 230 is rotated in the forward direction, the rotation power transmitted to the rotation gear part 30 through the pulley 20 may be transmitted to the case 40 through the first power transmission part 100, to rotate the case 40. When the pedal part 230 is rotated in the reverse direction, the rotation power transmitted to the rotation gear part 30 through the pulley 20 may be transmitted to the case 40 through a hooking gear 130 of the second power transmission part 110 that is in contact with the rotation gear part 30, only to rotating the case 40.

Figure 5:
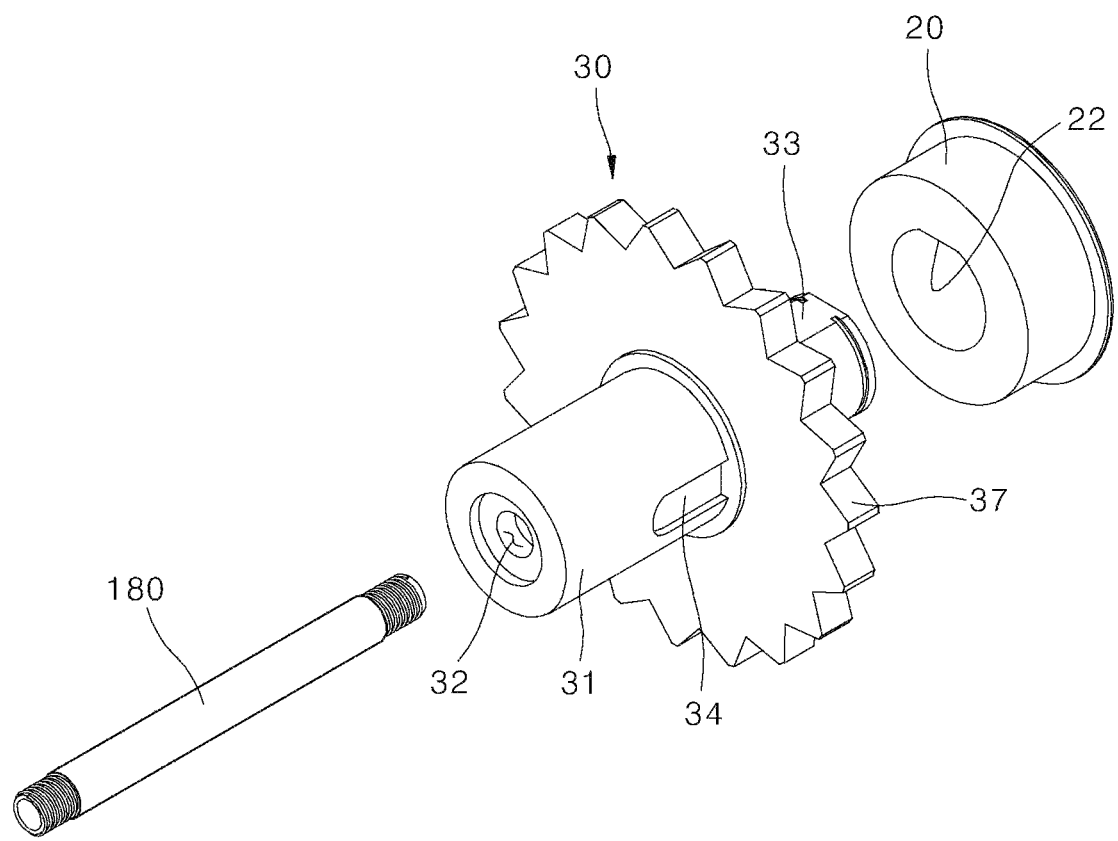
FIG. 5 is a perspective view showing a pulley and a rotation gear part according to an embodiment.

FIG. 5 is a perspective view showing a pulley 20 and a rotation gear part 30 according to an embodiment.

As shown in FIGS. 4 and 5, a groove for disposing at least one of a belt member, a chain or band may be provided on an outer surface of the pulley 20. Accordingly, the pulley 20 may receive power from the pedal part 230 through the at least one of the belt member, chain and band, to be rotated by the power.

The pulley 20 according to an embodiment may have a circular shape. The belt member may be provided on an outer surface of the pulley 20 and the rotation gear part 30 may be connected to an inner surface of the pulley 20. A hollow may be provided in the inner surface of the pulley 20 and an inner flat portion 22 having a planar shape may be provided on the inner surface of the pulley facing the rotation gear part 30.

The pulley 20 may be fixed to the outside of the rotation gear part 30 so that the pulley 20 may rotate together with the rotation gear part 30. A circular gear 37 may be provided along an outer circumference of the rotation gear part 30. Various modifications of the rotation gear part 30 may be implemented within a technical scope of rotating together with the pulley 20 and including a circular gear 37 provided on an outer surface to engage with the second power transmission part 110. The rotation gear part 30 according to an embodiment may include a rotation shaft member 31 and a circular gear 37.

The rotation shaft member 31 may have a rode shape extending from the center of the circular gear 37 to both sides, and the pulley 20 may be detachably coupled to one side (a right side of FIG. 5) of the rotary shaft member 31. An outer flat portion 33 corresponding to the inner flat portion 22 of the pulley 20 may be provided on the outside of the rotary shaft member 31. The outer flat portion 33 may form a flat portion on the outside of the rotary shaft member 31 so that the pulley 20 may be coupled to the outside of the rotary shaft member 31 to allow the inner flat portion 22 and the outer flat portion 33 may face each other. Accordingly, the outer flat portion 33 provided on the outside of the rotary shaft member 31 may be disposed in contact with the inner flat portion 22 of the pulley 20, and the rotary shaft member 31 may rotate together when the pulley 20 rotates.

A through-hole may be formed inside the rotary shaft member 31. The through-hole may extend along a longitudinal direction of the rotary shaft member 31, while penetrating the rotary shaft member 31. A shaft 180 which will be described later may be disposed inside the rotary shaft member 31 through the hole. Both ends of the shaft 180 may protrude toward both sides of the rotary shaft member 31 to be secured to the frame 200.

The circular gear 37 may form a gear along an outer circumference of the rotary shaft member 31, and may be modified in various embodiments within a technical scope of rotating together with the rotary shaft member 31. The circular gear 37 according to an embodiment may be a disc-shaped gear formed along an outer circumferential direction. The circular gear 37 may be secured to the outside of the rotary shaft member 31 and configured to rotate together with the rotary shaft member 31.

In addition, an outer key groove 34 may be provided on the outside of the rotary shaft member 31 to be connected with a first power transmission part 100. A first key member 103 of the first power transmission part 100, which will be described later, may be inserted in the outer key groove 34 to transmit a rotational power to a first power transmission body 101.

As shown in FIG. 4, the case 40 may rotatably support the rotation gear part 30. The case 40 may be modified in various embodiments within a technical scope of supporting the first power transmission part 100 and the second power transmission part 110. The case 40 according to an embodiment may include an outer case 50 and an inner case 60. The case 40 may further include a cover 90.

The outer case 50 may be modified in various embodiments within a technical scope of detachably accommodating the second power transmission part 110. The outer case 50 according to an embodiment may include an outer case body 51 and a mounting portion 52.

The outer case body 51 may be formed in a disc shape and a central hole in which the rotary shaft member 31 of the rotation gear part 30 is inserted may be formed in the center of the outer case body 51. The mounting portion 52 in which a power transmission case 170 is mounted may be spaced a preset distance apart from the central hole.

The mounting portion 52 may have a hole formed in the outer case body 51 to dispose the power transmission case 170. Accordingly, the second power transmission part 110 fabricated as a module may be detachably mounted in the mounting portion 52.

The pulley 20 may be provided on the outside of the outer case 50 and the first power transmission part 100 may be provided inside the outer case 50. The outer case body 51 having the disc shape may include an extension extending toward the cover 90.

The inner case 60 may be secured to the inside of the outer case 50. In addition, the inner case 60 may be connected with the first power transmission part 100 so that power may be transmitted to the inner case 60 through the first power transmission part 100 when the rotation gear 30 rotates in a clockwise direction. The inner case 60 may be modified in various embodiments within a technical scope of rotatably supporting an engaging gear 130 of the first power transmission part 110. The inner case 60 according to an embodiment may include an inner case body 70, a space maintaining protrusion 71, a first guide 72 and a rotation support 80.

The inner case 70 may be secured inside the outer case 50, and may be modified in various embodiments within a technical scope of having the rotation gear 30 at the center thereof. The inner case body 70 according to an embodiment may be secured to the outer case 50 with the circular gear 37 and the engaging gear 130 interposed therebetween. The inner case body 70 may be formed in a disc shape having a hollow and the engaging gear 130 may be rotatably coupled to the inner case body 70.

The space maintaining protrusion 71 may protrude toward the outer case 50 provided in the case 40 from the inner case body 70, and may be modified in various embodiments within a technical scope of maintaining a space between the inner case body 70 and the outer case 50 provided in the case 40. The space maintaining protrusion 71 according to an embodiment may be a protrusion protruding toward the outer case 50 from the inner case body 70, and may be secured by a screw member, in a state where a separate protrusion protruding from the outer case 50 is disposed inside the space maintaining protrusion 71.

The first guide 72 may have a groove formed in a lateral surface facing the second power transmission part 110, and may be modified in various embodiments within a technical scope of guiding the rotation of the second power transmission part 110. The first guide 72 according to an embodiment may include a first guide groove 73, and a second guide groove 74.

The first guide groove 73 may guide the rotation of the engaging gear 130 provided in the second power transmission part 110, and form a fan-shaped groove formed on a lateral surface of the inner case 60 facing the engaging gear 130. Accordingly, the rotation of the engaging gear 130 along the first guide groove 73 may be performed stably.

The second guide groove 74 may be provided inside the first guide groove 73, and the second guide groove 74 may be formed deeper than the first guide groove 73. Since the moving protrusion 161 protruding from the engaging gear body 140 is moved along the second guide groove 74, operation reliability of the engaging gear part 130 may be improved.

The connection hole 77 may be provided inside the first guide groove 73 and penetrate the inner case body 70. The engaging gear part 130 may be rotatable on the connection hole 77 and the center of the circular arc forming the second guide groove 74 may also become the connection hole 77.

The rotation support 80 may have a shape protruding from the inner case body 70 and surrounding the first power transmission part 100. The rotation support 80 may be modified in various embodiments within a technical scope of rotatably supporting the rotation of the rotation gear part 30. An inner key groove 81 for transmitting shaft rotation may be formed inside the rotation support 80.

Figure 10:
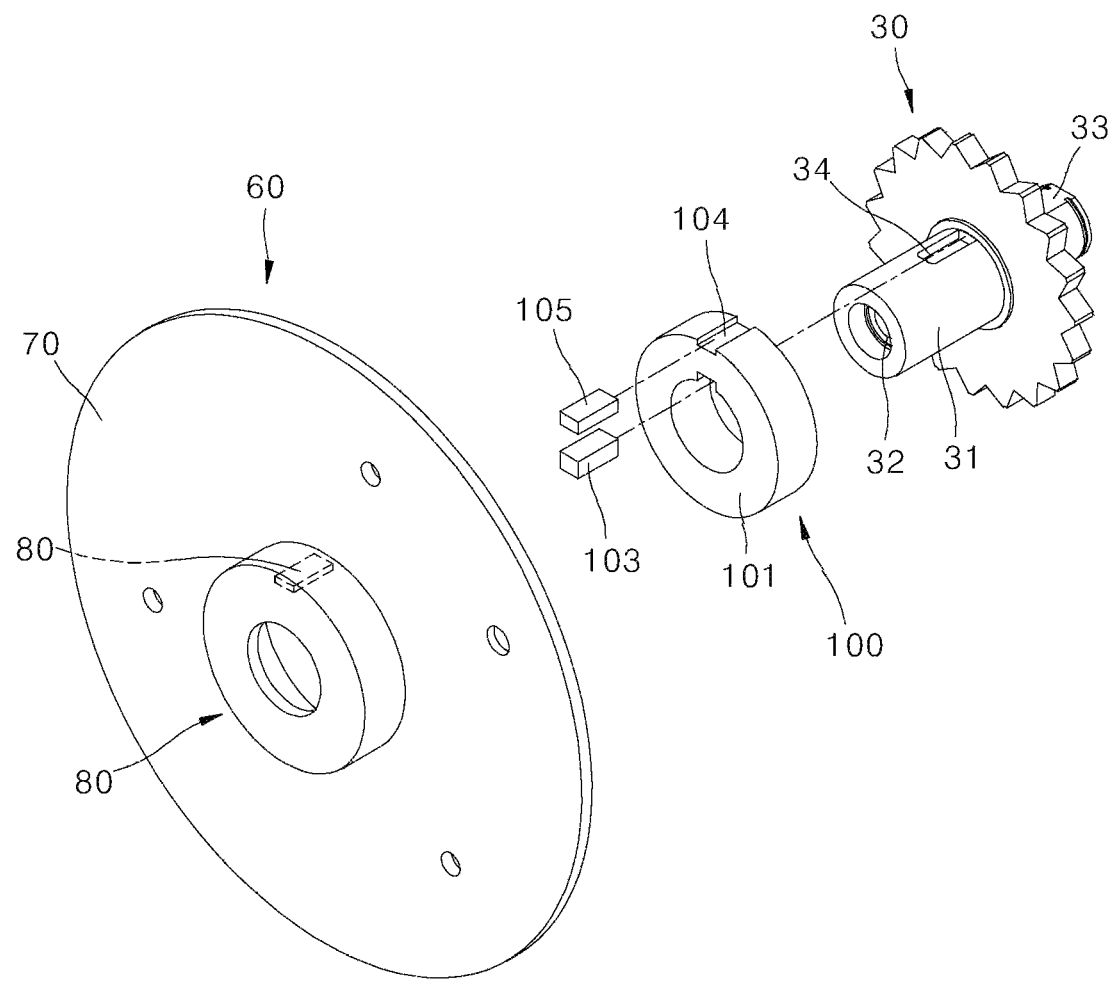
FIG. 10 is an exploded perspective view showing a first power transmission part according to an embodiment.

FIG. 10 is an exploded perspective view showing a first power transmission part 100 according to an embodiment.

As shown in FIGS. 4 and 10, the first power transmission part 100 may be connected with the rotation gear part 30 and the inner case 60 of the case 40, and may be modified in various embodiments within a technical scope of rotatably supporting the rotation gear part 30. The first power transmission part 100 may be configured to transmit the power transmitted to the rotation gear part 30 to the case 40, only when the rotation gear part 30 rotates in the forward direction (the clockwise direction). The first power transmission part 100 according to the embodiment may include a first power transmission body 101, a first key groove 102, a first key member 103, a second key groove 104 and a second key member 105.

The first power transmission body 101 may have a ring shape, and may be modified in various embodiments within a technical feature of transmitting only the forward rotation to the case 40. The first power transmission body 101 according to an embodiment may be a one-way clutch bearing.

The first key member 103 may connect the inside of the first power transmission body 101 with the outside of the rotation gear part 30. A first key groove 102 may be formed inside the first power transmission body 101 facing the rotation gear part 30. In a state where the outer key groove 34 provided in the rotation shaft member 31 faces the first key groove 102 formed in the first power transmission body 101, the first key member 103 may be inserted in the outer key groove 34 and the first key groove 102. Accordingly, the rotary shaft member 31 and the first power transmission body 101 may be connected with each other by the first key member 103.

The second key member 105 may be modified in various embodiments within a technical scope of connecting the outside of the first power transmission body 101 with the case 40. The second key member 105 according to an embodiment may have a rectangular parallelepiped shape and may be inserted in the second key groove 104 formed in the outside of the first power transmission body 101 and the inner key groove 81 formed in the inner case 60. Accordingly, the inner case 60 and the first power transmission body 101 may be connected with each other by the second key member 105.

Figure 6:
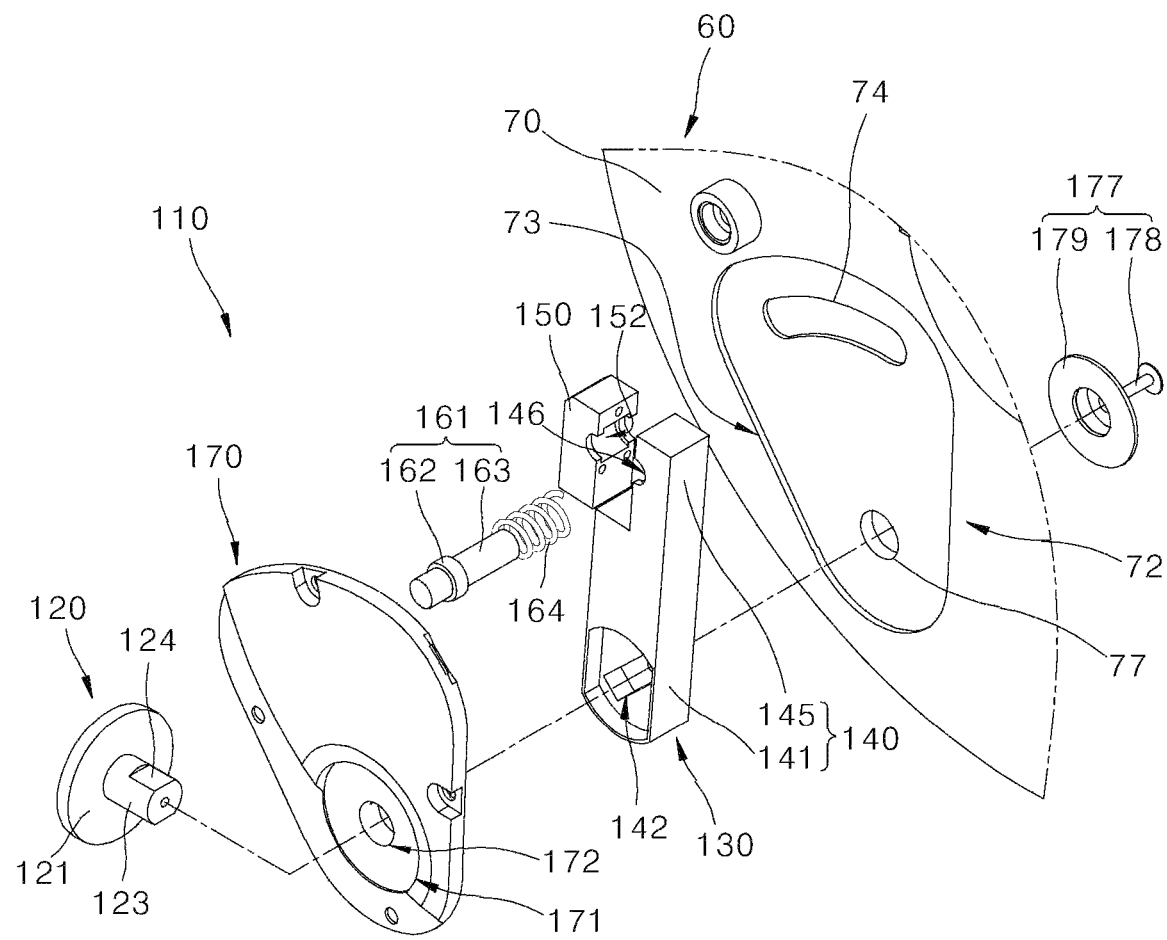
FIG. 6 is an exploded perspective view showing a second power transmission part according to an embodiment.

FIG. 6 is an exploded perspective view showing a second power transmission part 110 according to an embodiment.

As shown in FIGS. 4 and 6, the second power transmission part 110 may be provided in the case 40, and may be modified in various embodiments within a technical scope of being operated by an external force to engage with the circular gear 37. The second power transmission part 110 may be configured to transmit the power transmitted to the rotation gear part 30 to the case 40 when the rotation gear part 30 rotates in the reverse direction. The second power transmission part 110 according to an embodiment may include a handle 120, an engaging gear 130 and a power transmission case 170.

The handle 120 may be modified in various embodiments within a technical scope of being rotatably disposed in the power transmission case 170. The handle 120 according to an embodiment may include at least one of a handle body 121 and a handle protrusion 122, a connection pillar 123 and a flat engaging portion 124.

The handle body 121 may have a disc shape, and the handle protrusion 124 may protrude to a front surface of the handle body 121. Accordingly, when a user grabs and turns the handle protrusion 122, the handle portion 120 may be easily rotated.

The connection pillar 123 may have a column shape extending toward the rear side of the handle body 121. The flat engaging portion 124 may form a flat portion on each lateral surface of the connection pillar 123.

The engaging gear part 130 may be connected to the handle 120 with the power transmission case 170 interposed therebeween, and may be modified in various embodiments within a technical scope of rotating together with the handle 120. The engaging gear part 130 may be rotatably coupled to the case 40 and configured to rotate together with the handle 120 to engage with the circular gear 37, thereby disabling a freewheel function. The engaging gear part 130 according to an embodiment may include an engaging gear body 140, a coupling body 150 and an elastic engaging portion 160.

The engaging gear body 140 may be connected with the handle 120 to rotate together with the handle 120, and may be modified in various embodiments within a technical scope of disabling the freewheel function by engaging with the circular gear 37. The engaging gear body 140 according to an embodiment may include a first body 141 and a second body 145.

The first body may include connecting groove 142 to which the handle 120 is insertedly coupled, and may be rotatably coupled to the case 40. The first body 141 may have a rod shape, with the connecting groove 142 having a rectangular cross section. Since the connection pillar 123 is inserted in the connecting groove 142, the rotation of the connection pillar 123 and the engaging gear body 140 may be synchronized.

The second body 145 may extend from the first body 141 to rotate together with the first body 141 and engage with the gear of the circular gear 37. The second body 145 may be modified in various embodiments within a technical scope of being coupled to the coupling body 150 with the elastic engaging portion 160 interposed therebetween.

The width of the second body 145 may be shorter than that of the first body 141. A first inner groove 146 may be formed in an inner surface of the second body 145 facing the coupling body 150 to move the moving protrusion 161.

The coupling body 150 may be rotatably coupled to a lateral surface of the second body 145. A second inner groove 152 may be formed in a lateral surface of the coupling body 150 to communicate with the first inner groove 146. When the coupling body 150 is coupled to the second body 145, the first inner groove 146 and the second inner groove 152 may come into communication. Accordingly, the moving protrusion 161 and the elastic member 164 may be disposed inside an inner space defined by the first inner groove 146 and the second inner groove 152.

The elastic engaging portion 160 may be provided inside the engaging gear body 140 and the coupling body 150, and may be modified in various embodiments within a technical scope of being moved by elasticity to engage with the power transmission case 170. The elastic engaging portion 160 according to an embodiment may include a moving protrusion 161 and an elastic member 164.

The moving protrusion 161 may be provided at the boundary between the engaging gear body 140 and the coupling body 150. The moving protrusion 161 according to an embodiment may include an inner support body 162 provided in the inner space defined by the first inner groove 146 and the second inner groove 152, and a locking bar 163 protruding to both sides of the inner support body 162.

The inner support body 162 may have an outer diameter that is larger than the moving protrusion 161 and may be locked inside the inner space formed by the engaging gear body 140 and the coupling body 150.

In a state where the engaging gear body 140 and the coupling body 150 are coupled to each other, the moving protrusion 161 may protrude to the outside of the coupling body 150 and the engaging gear body 140. One side and the other side of the moving protrusion 161 may protrude to the outside of the engaging gear body 140 and the coupling body 150 so as to be movable along the first guide 72 and the second guide 173.

The elastic member 164 may be provided at the boundary between the engaging gear body 140 and the coupling body 150, and may be modified in various embodiments within a technical scope of pressurizing the moving protrusion 161 toward the outside of the engaging gear part 130. The elastic member 164 according to an embodiment may be a spring and provided in the inner space defined by the first inner groove 146 and the second inner groove 152. The elastic member 164 may pressurize the locking bar 163 toward the power transmission case 170 by pressurizing the inner support body 162.

Figure 7:
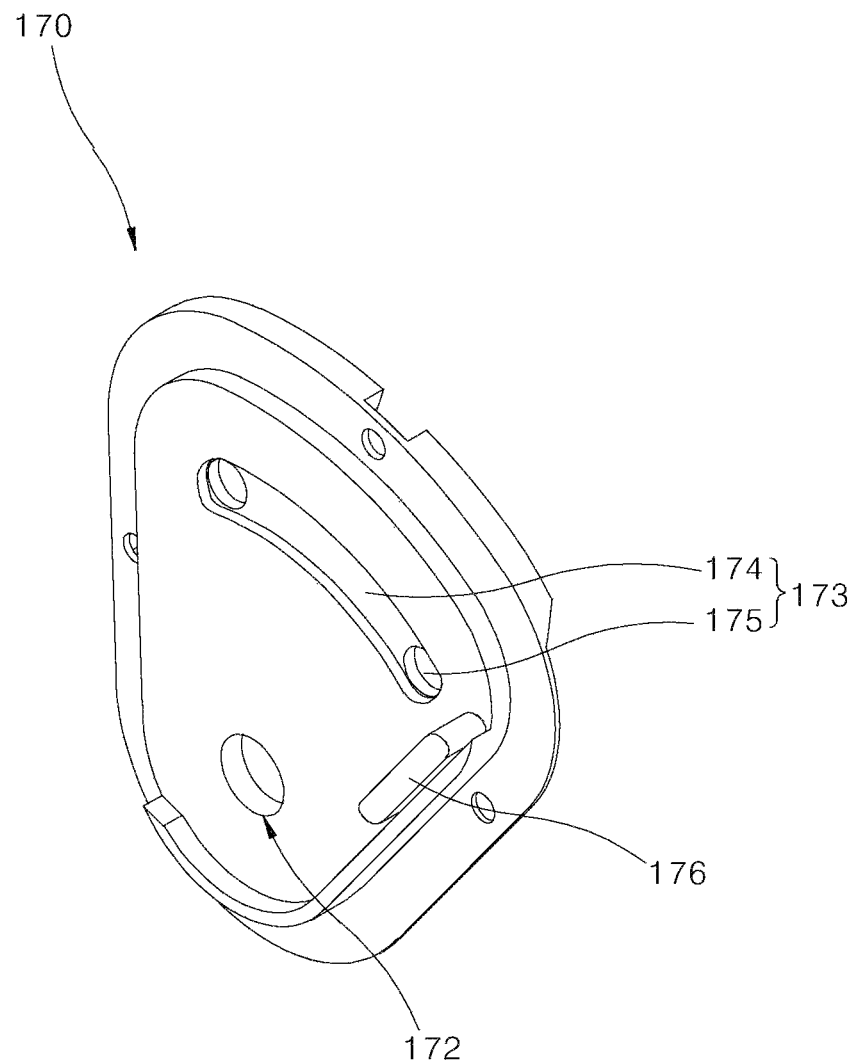
FIG. 7 is a perspective view showing a rear surface of a power transmission case according to an embodiment.

FIG. 7 is a perspective view showing a rear surface of a power transmission case 170 according to an embodiment.

As shown in FIGS. 6 and 7, the power transmission case 170 may be modified in various embodiments within a technical scope of being detachably coupled to the case 40. The power transmission case 170 according to an embodiment may include at least one of a seating groove 171, an inner hole 172, a second guide 173 and a stopper 176.

The power transmission case 170 may have a plate shape detachably mounted to the mounting portion 52 of the outer case 50. The heating groove 171 may be provided on the outside of the power transmission case that faces the handle 120. The seating groove 171 may provide a disc-shaped concave formed on the outside of the power transmission case 170. An inner hole 172 may be formed at the center of the seating groove 171 so that the handle 120 and the connection pillar 123 may penetrate the inner hole 172.

The second guide 173 may be provided on a rear surface of the power transmission case 170. The second guide 173 may have a groove formed on a lateral surface of the power transmission case 170 facing the second power transmission part 110, and may be modified in various embodiments within a technical scope of guiding the rotation of the second power transmission part 110. The second guide 173 according to an embodiment may include an inner guide groove 174 and a securing groove 175.

The inner guide groove 174 may be an arc-shaped groove formed along a route of the moving protrusion 161 provided in the engaging gear part 130. The inner guide groove 174 may be a curved groove formed in a lateral surface of the power transmission case 170 facing the moving protrusion 161.

The securing groove 175 may be provided in each of both sides of the inner guide groove 174, and may be modified in various embodiments within a technical scope of forming a groove at a position at which the engaging gear part 130 is stopped. The securing groove 175 according to an embodiment may be a groove formed deeper than the inner guide groove 174 and may be provided in each of both sides of the inner guide groove 174.

Figure 8:
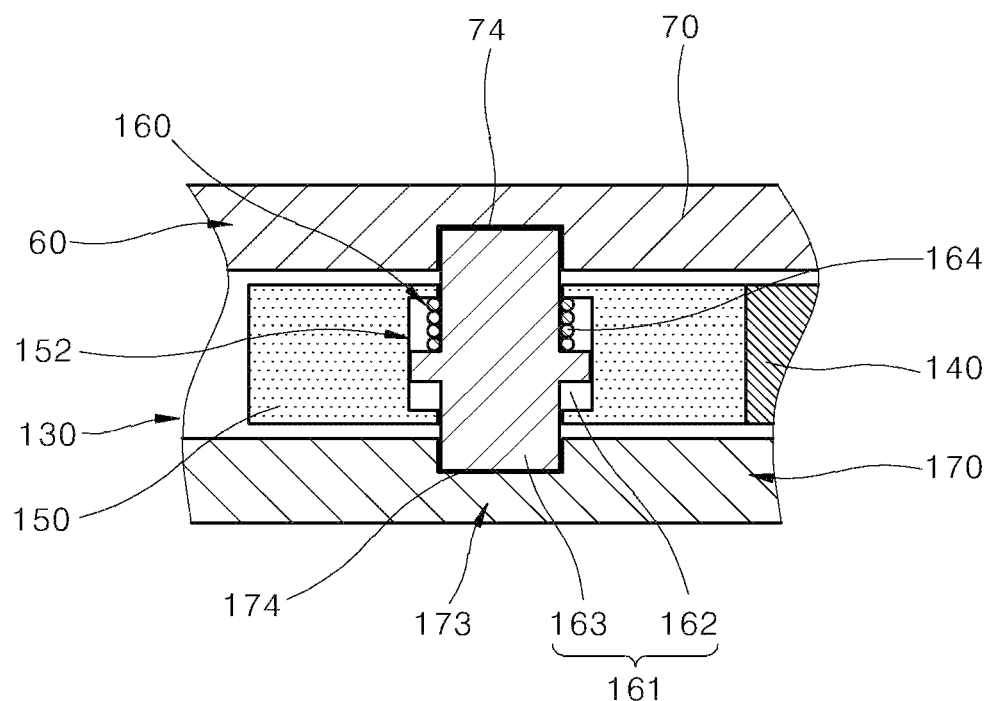
FIG. 8 is a sectional view showing a state in which a moving protrusion according to an embodiment is seated on an inner seating groove.

FIG. 8 is a sectional view showing a state in which a moving protrusion 161 according to an embodiment is seated on an inner seating groove.

As shown in FIG. 8, when the moving protrusion 161 is disposed in an upright state, the inner case 60 may be positioned on the moving protrusion 161 and the power transmission case 170 may be positioned under the moving protrusion 161. The moving protrusion 161 may be pressurized downward to the power transmission case 170 by the elastic member 164.

An upper area of the moving protrusion 161 may be moved along the first guide 72 provided in the inner case 60. The moving protrusion 161 may be moved along the second guide 74 so that the rotation of the moving protrusion 161 may be stably performed.

A lower area of the moving protrusion 161 may be moved along the second guide 173 provided in the power transmission case 170. The lower area of the moving protrusion 161 may be moved along the inner guide groove 174 so that the rotation of the moving protrusion 161 may be stably performed.

Figure 9:
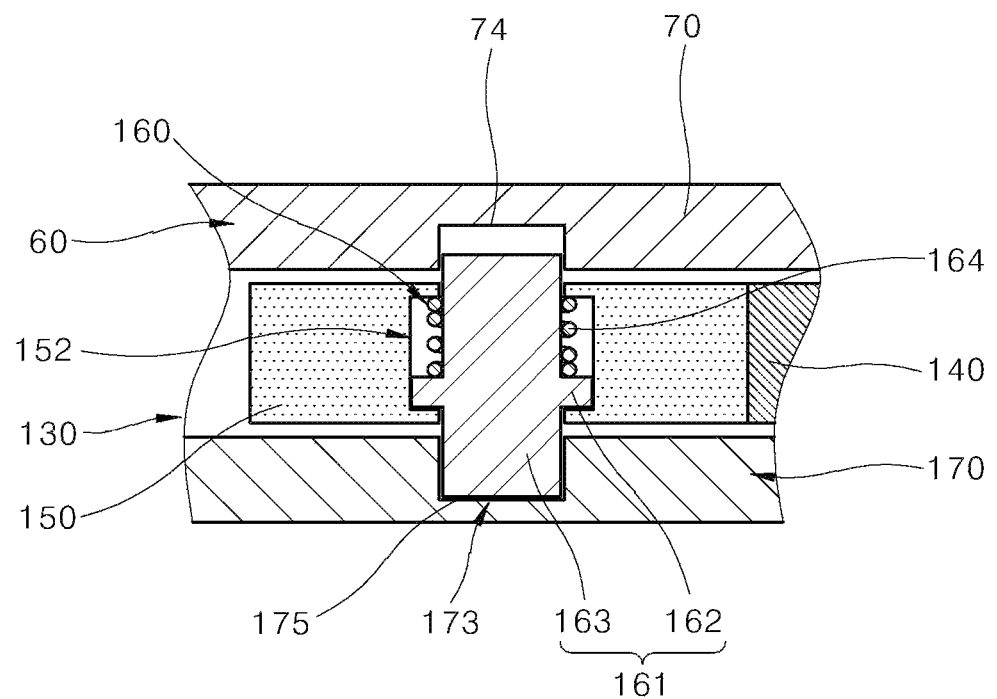
FIG. 9 is a sectional view showing a state in which a moving protrusion according to an embodiment is seated on a securing groove.

FIG. 9 is a sectional view showing a state in which a moving protrusion 161 according to an embodiment is seated on a securing groove 175.

The lower area of the moving protrusion 161 may be moved along the inner guide groove and then inserted in the securing groove 175 formed deeper than the inner groove so that the moving of the moving protrusion can be locked. Accordingly, the moving protrusion 161 may be prevented from being separated from the securing rove 175 until a force equal to or greater than a preset external force is transmitted to the second power transmission part 110.

As shown in FIG. 6, the gear securing portion 177 may be coupled to an end of the connection pillar 123 inserted in the engaging gear part 130 through the connection hole 77. Accordingly, the handle 120 and the engaging gear part 130 may be rotatable with respect to the gear securing portion 177. The gear securing portion 177 according to an embodiment may include a fastening member 178 and a washer 179. In a state where the washer 179 having a ring shape is disposed in the rear of the inner case body 70, the fastening member 178 may be fastened to the end of the connection pillar 123 provided inside the connection hole 77 through the washer 179.

As shown in FIGS. 3 and 4, a shaft 180 may have a shape penetrating the case 40 and the rotation gear part 30. Accordingly, the case 40 and the rotation gear part 30 may be rotatable with respect to the shaft 180.

Figure 13:
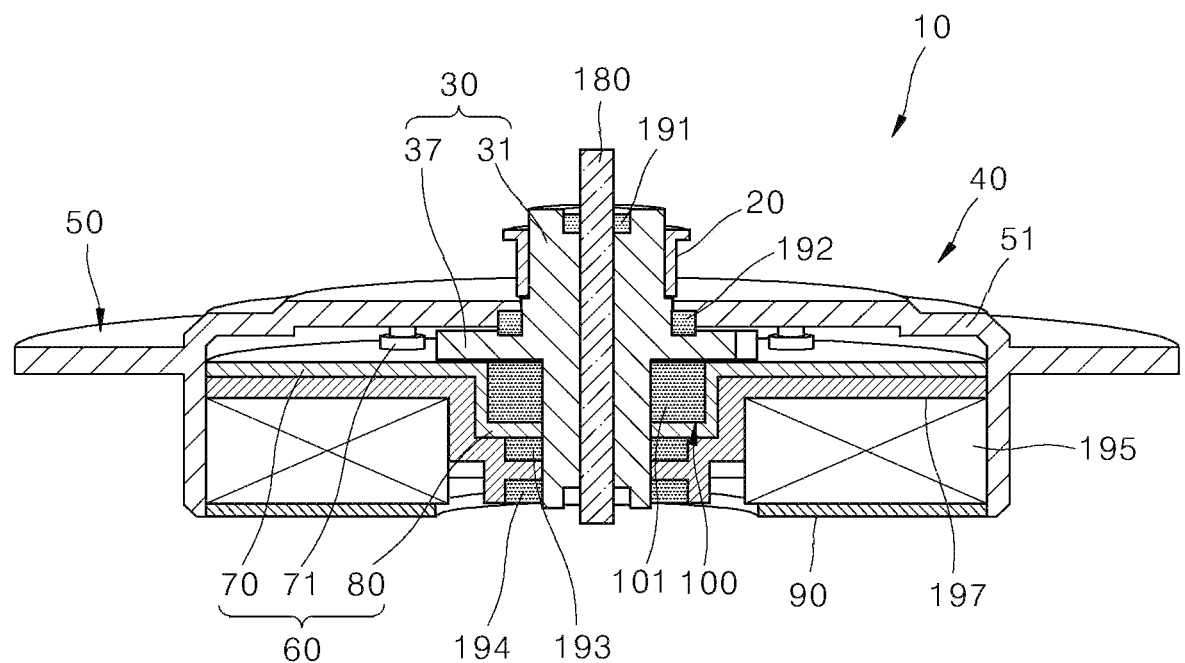
FIG. 13 is a sectional view of a freewheel adjustable wheel according to an embodiment.

FIG. 13 is a sectional view of a freewheel adjustable wheel 10 according to an embodiment.

As shown in FIGS. 4 and 13, a bearing part 190 may be provided to reduce the friction generated during the rotation of the rotation gear part 30. The bearing part 190 according to an embodiment may include a first bearing 191, a second bearing 192, a third bearing 193 and a fourth bearing 194.

The first bearing 191 may be disposed between the rotary shaft member 31 and the shaft 180, and configured to rotatably support the shaft 180. The second bearing 192 may be disposed between the outer case 50 and the rotary shaft member 31, and configured to rotatably support the rotary shaft member 31. The third bearing 193 and the fourth bearing may be configured to rotatably support the outside of the rotary shaft member 31 disposed between the inner case 60 and the cover 90.

Meanwhile, a rotation adjustment part unit 195 for adjusting the power used in rotating the case 40 may be disposed between the inner case 60 and the cover 90. The rotation adjustment unit 195 according to an embodiment may use a motor and may adjust the strength of the force for rotating the freewheel adjustable wheel 10 based on the change in magnetic force of an electromagnet. The technical feature in that the rotation adjustment unit 195 may be provided on the wheel of the exercise bicycle 10 to adjust the force to rotate the freewheel adjustable wheel 10 is well-known in the art, and detailed description thereof will be omitted accordingly.

A bearing bracket 197 may be additionally provided between the inner case 60 and the cover 90 to support the third bearing 193 and the fourth bearing 194. The rotation adjustment unit 195 may be disposed between the bearing bracket 197 and the cover 90.

Hereinafter, an operational state of the freewheel adjustable wheel 10 and the exercise bicycle 1 including the same according to an embodiment will be described in detail.

Figure 11:
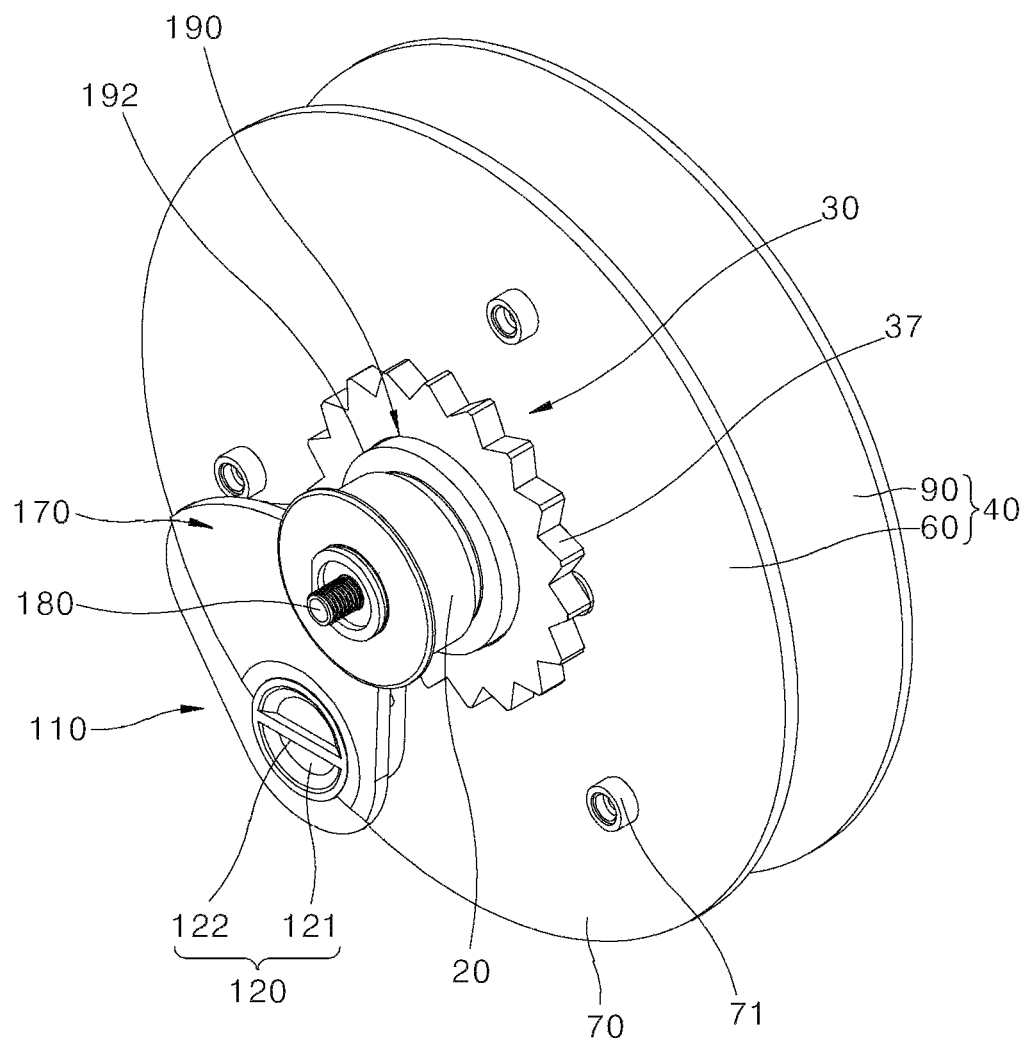
FIG. 11 is a perspective view showing a state in which a second power transmission part is disposed on a lateral surface of a rotation gear part according to an embodiment.

FIG. 11 is a perspective view showing a state in which a second power transmission part 110 is disposed on a lateral surface of a rotation gear part 30 according to an embodiment.

As shown in FIGS. 1 and 11, the power to turn the pedal is transmitted to the pulley 20 through a belt member or the like. The pulley 20 may be rotated together with the rotation gear part 30.

Figure 12:
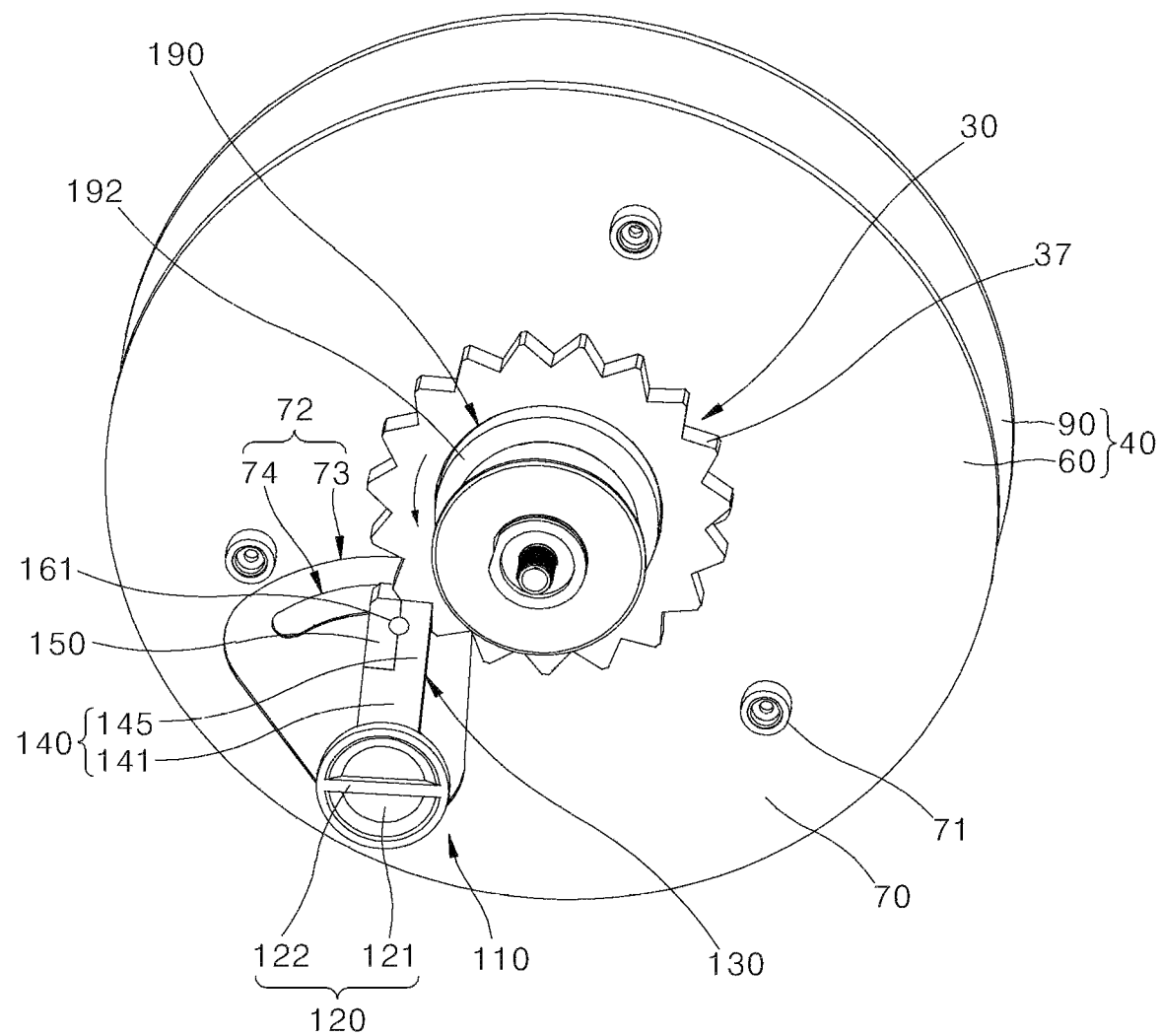
FIG. 12 is a perspective view showing a state in which an engaging gear part according to an embodiment is engaged with a circular gear.
Figure 15:
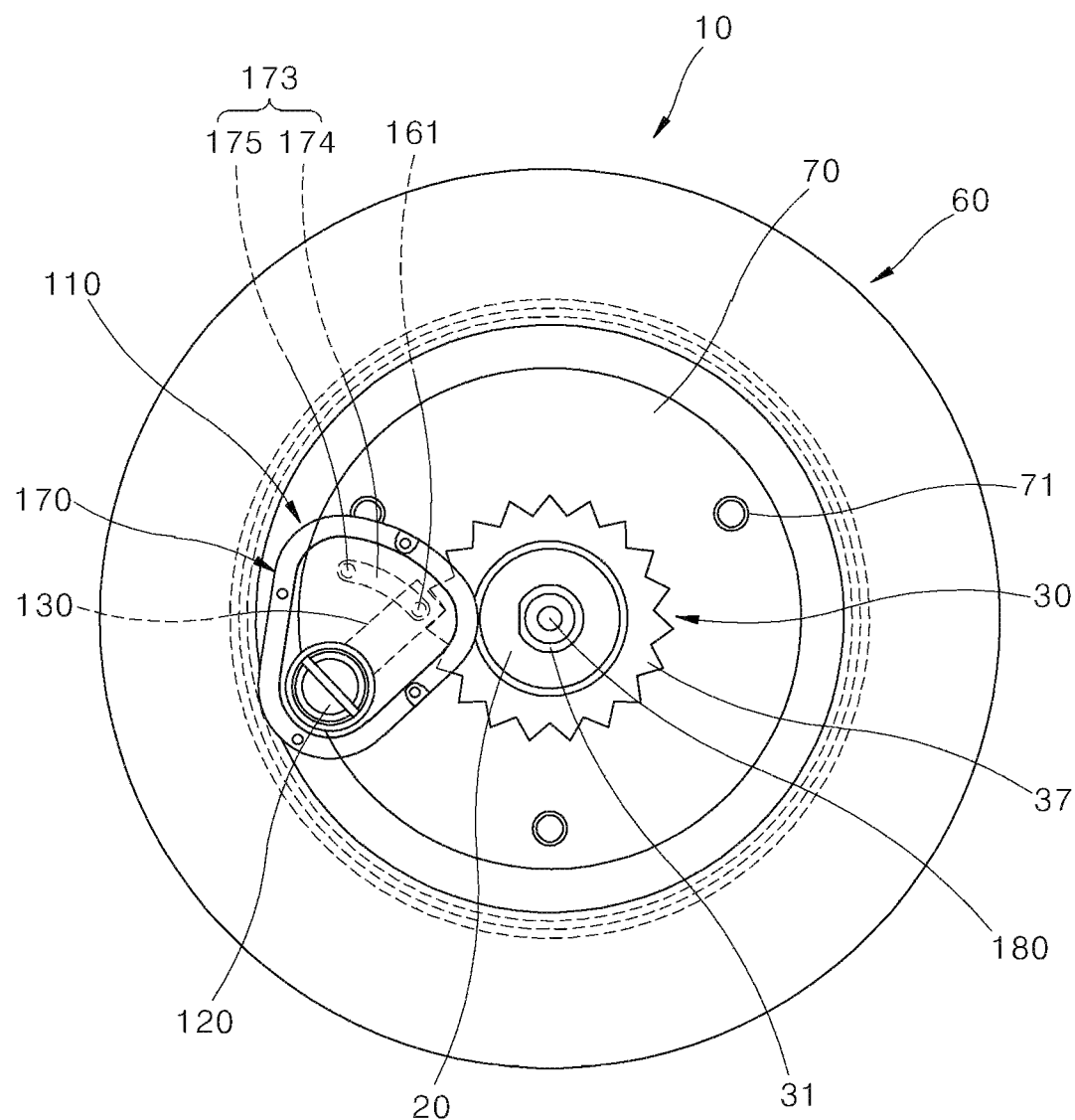
FIG. 15 is a front view showing a state in which a engaging gear part according to an embodiment is engaged with a circular gear.

FIG. 12 is a perspective view showing a state in which an engaging gear part 130 according to an embodiment is engaged with a circular gear 37. FIG. 15 is a front view showing a state in which an engaging gear part 130 according to an embodiment is engaged with a circular gear 37.

As shown in FIGS. 12 and 15, when the user grabs and turn the handle 120 to use a non-freewheel mode, the handle 120 and the engaging gear part 130 may be rotated together to be engaged with the circular gear 37 of the rotation gear 30. Accordingly, when the pulley 20 is rotated in the reverse direction (a counter-clockwise direction of FIG. 15), power may be transmitted to the engaging gear part 130 engaged with the circular gear 37.

Since the engaging gear part 130 may be rotatably secured to the inner case 60, the engaging gear part 130 and the inner case 60 may be rotated together in the reverse direction. Since the inner case 60 is connected with the outer case 50, the outer case 50 together with the inner case 60 may be rotated in the reverse direction.

Accordingly, as shown in FIG. 1, the freewheel adjustable wheel 10 installed in the frame 200 of the exercise bicycle 1 may be rotated in the reverse direction.

As shown in FIGS. 12 and 15, when the pulley 20 is rotated in the forward direction, the rotation gear part 30 together with the pulley 20 may be rotated in the forward direction. The rotation gear part 30 and the inner case 60 may be connected with each other through the first power transmission part 100. The inner case 60 may be also rotated in the forward direction by the first power transmission body 101, which is an one-way clutch bearing configured to transmit only the forward direction power.

In the non-freewheel mode, when the pulley 20 is rotated in the forward direction, the freewheel adjustable wheel 10 including the case 40 may be rotated in the forward direction. When the pulley 20 is rotated in the reverse direction, the freewheel adjustable wheel 10 including the case 40 may be rotated in the reverse direction.

Figure 14:
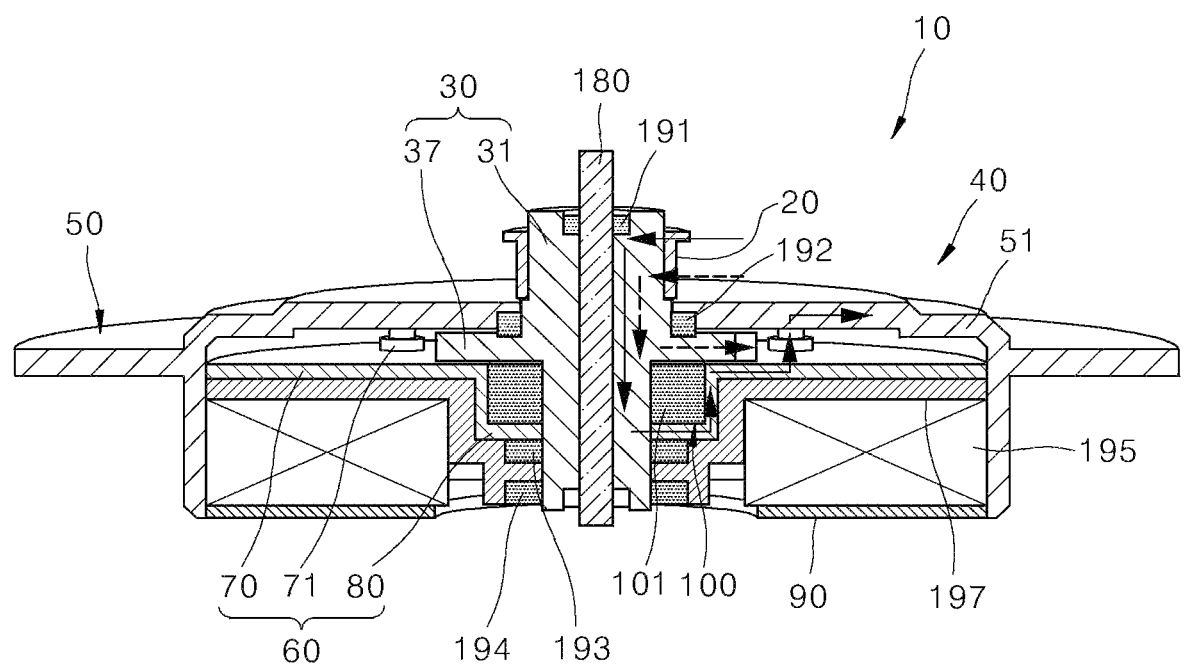
FIG. 14 is a sectional view showing power transmission of a freewheel adjustable wheel according to an embodiment.
Figure 16:
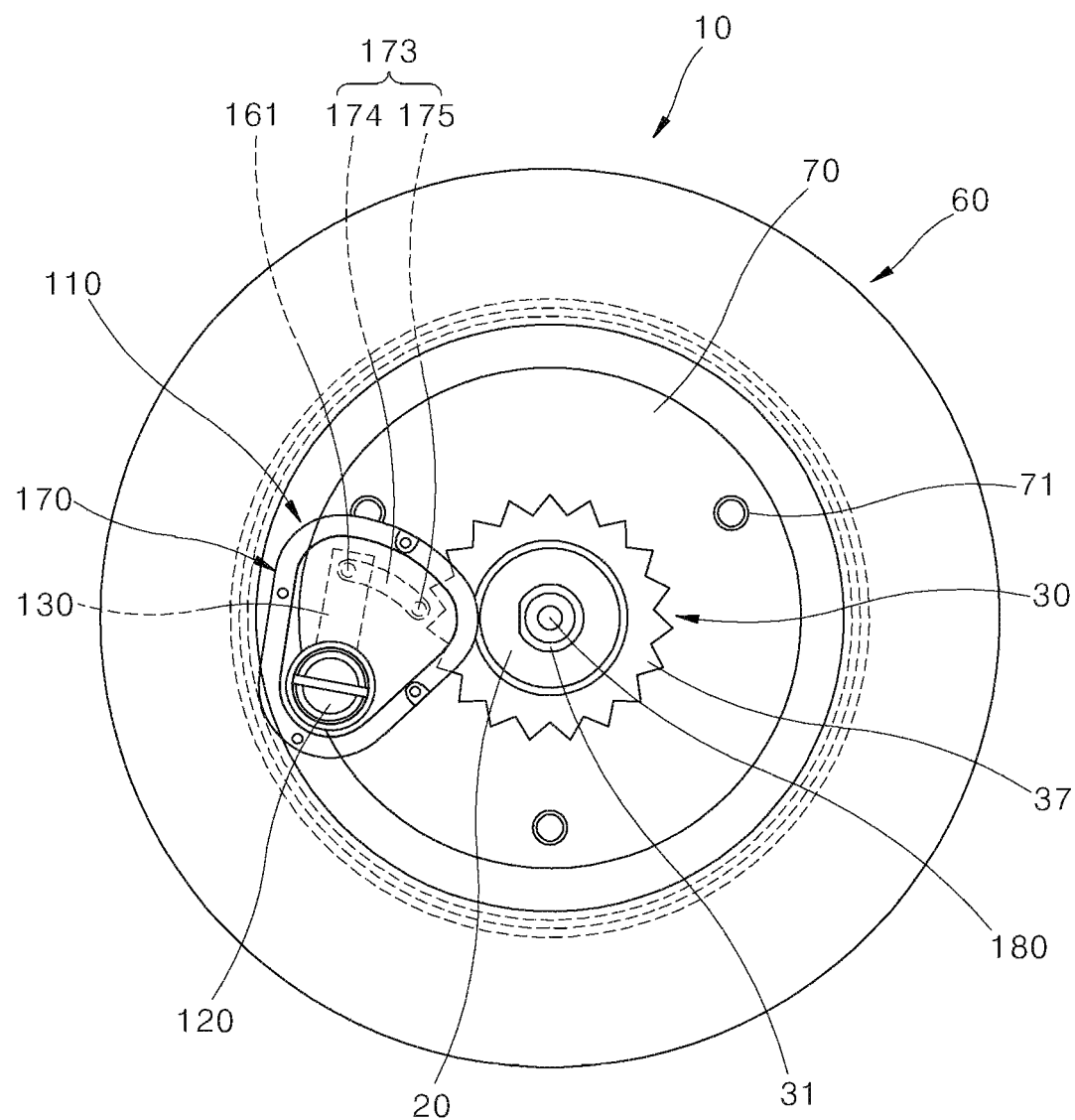
FIG. 16 is a front view showing a state in which an engaging gear part according to an embodiment is spaced apart from a circular gear.

FIG. 14 is a sectional view showing power transmission of a freewheel adjustable wheel 10 according to an embodiment. FIG. 16 is a front view showing a state in which an engaging gear part 130 according to an embodiment is spaced apart from a circular gear 37.

As shown in FIGS. 14 and 16, when the user grabs and turns the handle 120 to use a freewheel mode, the engaging gear part 130 may be rotated together with the handle 120 to be spaced a preset distance apart from the circular gear 37. Accordingly, when the pulley 20 is rotated in the reverse direction (the counter-clockwise direction of FIG. 16), power transmission to the engaging gear part 130 from the circular gear 37 may be blocked not to rotate the inner case 60.

As shown in FIGS. 4 and 10, when the pulley 20 is rotated in the forward direction, the rotation gear part 30 may be rotated in the forward direction together with the pulley 20. The rotation gear part 30 and the inner case 60 may be connected with each other through the first power transmission part 100. The inner case 60 may be also rotated in the forward direction by the first power transmission body 101, which is an one-way clutch bearing configured to transmit only the forward direction power.

In the freewheel mode, when the pulley 20 is rotated in the forward direction, the freewheel adjustable wheel 10 including the case 40 may be rotated in the forward direction. When the pulley 20 is rotated in the reverse direction, the freewheel adjustable wheel 10 including the case 40 may be not rotated.

According to the present disclosure, in the freewheel mode, only the first power transmission part 110 that is the one-way clutch bearing may be operated so that noiseless operation can be realized. In the non-freewheel mode, the second power transmission part 110 may be operated in the rotation locking structure so that power transmission from the rotation gear part 30 to the case 40 may be quickly facilitated through the second power transmission part 110.

In addition, the present disclosure may provide the structure of switching the mode by grabbing and turning the handle 120 so that the operation mode can be switched easily and intuitively.

As mentioned above, the freewheel function may be selectively used by the operation of the second power transmission part 110 in the present disclosure, thereby improving the usability of the exercise equipment. Also, it is not necessary to separately purchase exercise equipment based on the presence of the freewheel function. Accordingly, purchase cost of exercise equipment may be reduced. In addition, since the second power transmission part 110 is operated by the user's manipulation without using a separate driving motor, electricity costs can be reduced. In addition, since the second power transmission part 110 is configured of a module and detachably coupled in the case 40, the time and cost required for replacement and repair of the second power transmission part 110 may be reduced. In addition, the elastic engaging portion 160 may be inserted in the securing groove 175 of the power transmission case 170 to maintain a still state, thereby improving the operation reliability.

The embodiments are described above with reference to a number of illustrative embodiments thereof. However, the present disclosure is not intended to limit the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

The invention claimed is:

1. A freewheel adjustable wheel comprising:
   a pulley rotatable by power transmitted from a pedal;
   a rotation gear part rotatable together with the pulley secured to an outside thereof, and comprising a circular gear provided along an outer circumference of the rotational gear part;
   a case rotatably supporting the rotation gear part;
   a first power transmission part connected to the rotation gear part and the case and rotatably supporting the rotation gear part, and configured to transmit power transmitted to the rotation gear to the case when the rotation gear part is rotated in a forward direction; and
   a second power transmission part provided in the case and engaged with the circular gear by operation by an external force, and configured to transmit power transmitted to the rotation gear part to the case when the rotation the rotation gear part is rotated in a reverse direction.

2. The freewheel adjustable wheel of claim 1, wherein the rotation gear part comprises,
   a rotary shaft member extending from a center of the circular gear to both sides thereof, the rotary shaft member in which the pulley is detachable provided and configured to rotate together with the pulley.

3. The freewheel adjustable wheel of claim 1, wherein the case comprises,
   an outer case in which the second power transmission part is detachable provided, the outer case having the pulley disposed on an outside thereof and the first power transmission part disposed on an inside thereof; and
   an inner case secured inside the outer case and connected with the first power transmission part, the inner case rotatably supporting the second power transmission part.

4. The freewheel adjustable wheel of claim 3, wherein the inner case comprises,
   an inner case body secured to the inside of the outer case and having a center at which the rotation gear part is disposed; and
   a rotation support protruding from the inner case body, with a shape surrounding the first power transmission part, and rotatably supporting the rotation gear part.

5. The freewheel adjustable wheel of claim 4, wherein the inner case comprises,
   a space maintaining protrusion protruding toward the case and configured to maintain a space between the inner case body and the case.

6. The freewheel adjustable wheel of claim 4, wherein the inner case further comprises,
   a first guide having a groove formed on a lateral surface thereof facing the second power transmission part, and configured to guide rotation of the second power transmission part.

7. The freewheel adjustable wheel of claim 6, wherein the first guide comprises,
   a first guide groove configured to guide rotation of an engaging gear part provided in the second power transmission part, and having a fan-shaped groove formed on a lateral surface of the inner case facing the engaging gear part; and
   a second guide provided inside the first guide groove and having an arc-shaped groove formed along a moving path of the engaging gear part.

8. The freewheel adjustable wheel of claim 1, wherein the first power transmission part comprises a first power transmission body having a ring shape, and
   the first power transmission body is a one-way clutch bearing.

9. The freewheel adjustable wheel of claim 8, wherein the first power transmission part comprises,
   a first key member connecting an inside of the first power transmission body and an outside of the rotation gear part with each other; and
   a second key member connecting an outside of the first power transmission body and the case with each other.

10. The freewheel adjustable wheel of claim 1, wherein the second power transmission part comprises,
    a power transmission case detachably coupled inside the case;
    a handle rotatably coupled to the power transmission case; and
    an engaging gear part connected with the handle with the power transmission case interposed therebetween and rotatably coupled to the case, and configured to be rotated together with the handle and engaged with the circular gear.

11. The freewheel adjustable wheel of claim 10, wherein the engaging gear part comprises,
    an engaging gear body connected with the handle and configured to be rotated together with the handle and engaged with circular gear;
    a coupling body coupled to the engaging gear body; and
    an elastic engaging portion provided in the engaging gear body and the coupling body, and configured to be moved by elasticity and engaged with the power transmission case.

12. The freewheel adjustable wheel of claim 11, wherein the engaging gear body comprises,
    a first body comprising a connection groove in which the handle is inserted to be engaged therewith; and
    a second body extending from the first body and coupled to the coupling body with the elastic engaging portion interposed therebetween, and configured to be engaged with a gear of the circular gear.

13. The freewheel adjustable wheel of claim 11, wherein the elastic engaging portion comprises,
    a moving protrusion provided at a boundary between the engaging gear body and the coupling body and protruding to an outside of the engaging gear part; and
    an elastic member provided at a boundary between the engaging gear body and the coupling body and configured to pressurize the moving protrusion toward an outside of the engaging gear part.

14. The freewheel adjustable wheel of claim 10, wherein the power transmission case further comprises a second guide having a groove formed a lateral surface thereof facing the second power transmission part and configured to guide rotation of the second power transmission part.

15. The freewheel adjustable wheel of claim 14, wherein the second guide comprises,
    an inner guide groove having an arc-shaped groove formed along a moving path of the engaging gear part; and
    a securing groove provided in both sides of the inner guide groove and having a groove formed at a position at which the engaging gear part is stopped.

16. An exercise bicycle comprising:
    a frame supporting a bicycle seat and a handle;
    a pedal rotatably coupled to the frame;
    a pulley rotatable by power transmitted from the pedal;
    a rotation gear part rotatable together with the pulley secured to an outside thereof, and comprising a circular gear along an outer circumference of the rotational gear part;
    a shaft connected with the frame through the rotation gear part;
    a case rotatably supporting the rotation gear part;
        a first power transmission part connected to the rotation gear part and the case and rotatably supporting the rotation gear part, and configured to transmit power transmitted to the rotation gear to the case when the rotation gear part is rotated in a forward direction; and
        a second power transmission part provided in the case and engaged with the circular gear by operation by an external force, and configured to transmit power transmitted to the rotation gear part to the case when the rotation the rotation gear part is rotated in a reverse direction.

17. The exercise bicycle of claim 16, wherein the case comprises,
    an outer case in which the second power transmission part is detachable provided, the outer case having the pulley disposed on the outside thereof and the first power transmission part disposed on the inside thereof; and
    an inner case secured inside the outer case and connected with the first power transmission part, the inner case rotatably supporting the second power transmission part.

18. The exercise bicycle of claim 16, wherein the rotation gear part comprises,
    a rotary shaft member extending from a center of the circular gear to both sides thereof, the rotary shaft member in which the pulley is detachable provided and configured to rotate together with the pulley.

19. The exercise bicycle of claim 16, wherein the second power transmission part comprises, a power transmission case detachably coupled inside the case;

a handle rotatably coupled to the power transmission case; and an engaging gear part connected with the handle with the power transmission case interposed therebetween and rotatably coupled to the case, and configured to be rotated together with the handle and engaged with the circular gear.

20. The exercise bicycle of claim 16, wherein the engaging gear part comprises, an engaging gear body connected with the handle and configured to be rotated together with the handle and engaged with circular gear;

a coupling body coupled to the engaging gear body; and an elastic engaging portion provided in the engaging gear body and the coupling body, and configured to be moved by elasticity and engaged with the power transmission case.

* * * * *